United States Patent [19]

Handke et al.

[11] Patent Number: 5,423,403
[45] Date of Patent: Jun. 13, 1995

[54] FASTENING DEVICES ON A SHOCK ABSORBER OUTER TUBE

[75] Inventors: Günther Handke, Euerbach; Bruno Deigner, Schweinfurt, both of Germany

[73] Assignee: Fichtel & Sachs AG, Schweinfurt, Germany

[21] Appl. No.: 186,051

[22] Filed: Jan. 24, 1994

[30] Foreign Application Priority Data

Jan. 26, 1993 [DE] Germany .............................. 4302024

[51] Int. Cl.⁶ .......................... B60G 15/00; F16F 9/00
[52] U.S. Cl. ............................ 188/322.11; 280/96.1; 280/668
[58] Field of Search ................ 188/322.11, 322.12; 280/661, 668, 701, 696, 724, 725, 96.1, 660

[56] References Cited

U.S. PATENT DOCUMENTS

| | | | |
|---|---|---|---|
| 4,491,339 | 1/1985 | Mizumukai et al. | 280/668 |
| 4,577,534 | 3/1986 | Rayne | 280/661 X |
| 4,871,187 | 10/1989 | Schaible | 280/701 X |
| 5,145,204 | 9/1992 | Perkins | 188/321.11 X |
| 5,180,129 | 1/1993 | Yamaoka et al. | 280/668 X |

FOREIGN PATENT DOCUMENTS

8609696  7/1986  Germany .

Primary Examiner—Robert J. Oberleitner
Assistant Examiner—Kevin D. Rutherford
Attorney, Agent, or Firm—Nils H. Ljungman & Associates

[57] ABSTRACT

Fastening device on the outer tube of a shock absorber, comprising a receptacle for the connection to a vehicle axle and, optionally or in combination, additional mountings for a roll stabilizer and for brake hoses, whereby the connection and the additional mountings are at a distance from one another, characterized by the fact that the receptacle and the mountings are components of a one-piece fastening device, whereby the distance between the receptacle and the additional mountings is bridged by a connecting web.

20 Claims, 9 Drawing Sheets

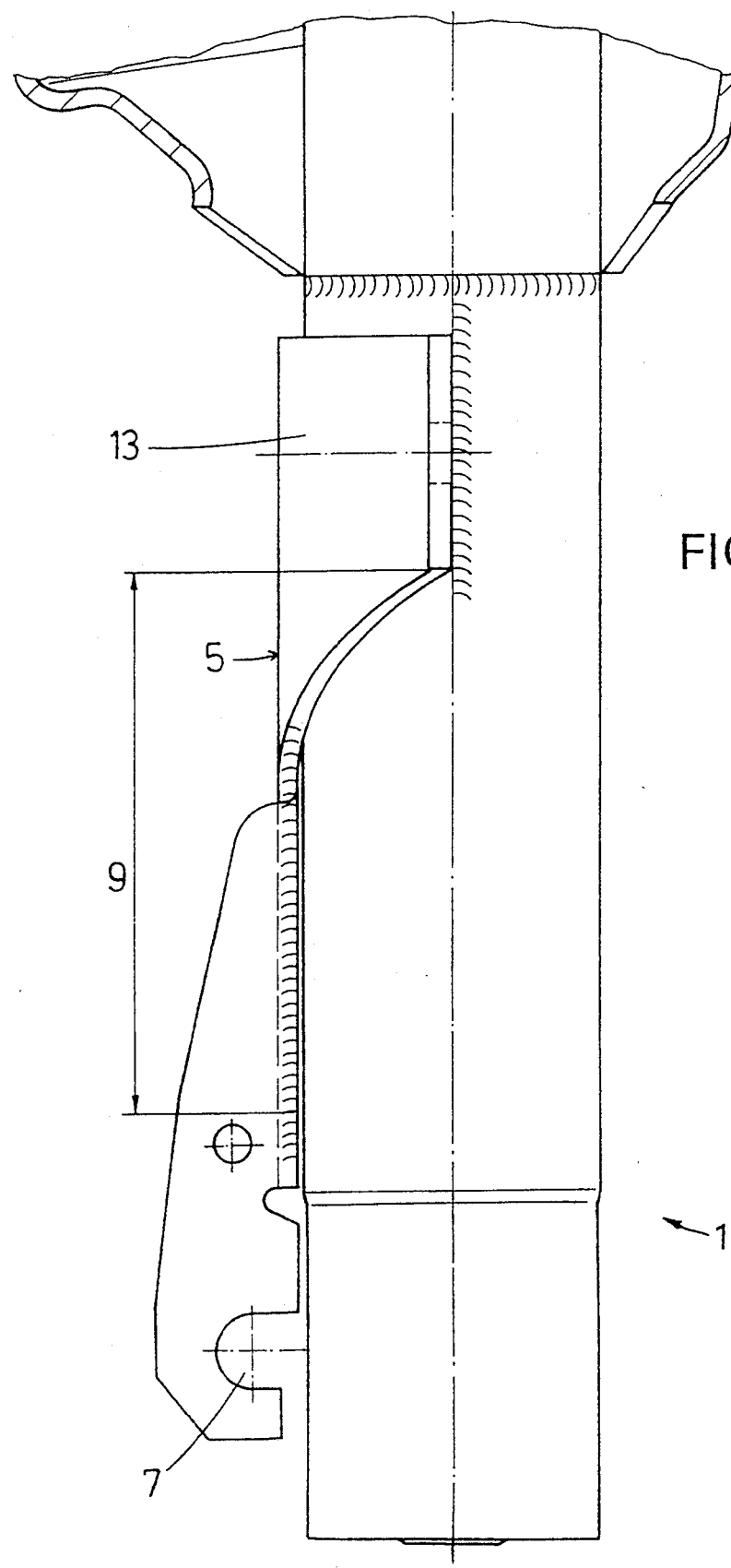

FASTENING DEVICES ON A SHOCK ABSORBER OUTER TUBE

BACKGROUND OF THE INVENTION

1. Field of the Invention

This invention relates to a fastening device on the outer tube of a shock absorber, comprising a receptacle for connection to a vehicle axle and, optionally or in combination, additional mountings for a roll stabilizer and for brake hoses, whereby the connection and the additional mountings are at a distance from one another.

2. Background Information

On known shock absorbers, the receptacles or mountings for the steering stub axle, the brake hoses and the roll stabilizer are each usually formed by an individual part. That tends to result in positioning problems during the welding process. Generally, at least the roll stabilizer mounting and the receptacle for the steering stub axle must be at a certain distance from one another, because this distance tends to indirectly influence the prestress of the roll stabilizer. In known shock absorbers, the add-on parts were usually welded in complicated devices, which would limit the amount of automation which could be effectively used in the manufacturing process.

An additional disadvantage, for the roll stabilizer mounting in particular, resides in the fact that a weld seam must be laid down in the circumferential direction of the roll stabilizer mounting. To prevent the distortion of the outer tube, the weld seam is usually extended to run all the way around the outer tube, although that does not tend to increase the strength of the roll stabilizer mounting.

OBJECT OF THE INVENTION

The object of the present invention is to significantly reduce the time, effort and expense required to fabricate the above-mentioned add-on parts, to guarantee compliance with the specified tolerances or remain well within them, and to improve the utilization of the weld seams to increase strength.

SUMMARY OF THE INVENTION

The invention teaches that the above object is achieved by the fact that, preferably, the receptacle and the mountings are components of a one-piece fastening device, whereby the distance between the receptacle and the additional mountings is bridged by a connecting web.

The one-piece design of the fastening device significantly simplifies the construction of the necessary welding apparatus, since essentially all the angular measurements, in particular in the circumferential direction, have been taken into consideration as a result of the one-piece design of the part. The same is true for the distance between the receptacle for the steering stub axle and the roll stabilizer mounting. The achievable tolerance is determined exclusively by the blanking or stamping die. Tests have shown that the tolerance range can be reduced to as little as one-fifth of what it was previously, in known devices.

On the fastening device, moreover, the width of the connecting web essentially represents a ring-shaped section, whereby the inside diameter is preferably adapted to the outside diameter of the outer tube. The connecting web can advantageously be used for welding connections to the outer tube. Since the connecting web runs essentially in the direction of the principal axis of the outer tube, distortion is essentially impossible.

In particular for shock absorbers for front axles, it can be advantageous in terms of the utilization of material if the dimensions of the stamping blank for the fastening device are determined essentially by the distance between the two locator holes for the stabilizer and by the distance between the receptacle and the horizontal center line of the locator holes.

As a rule, motor vehicles do not tend to have a roll stabilizer on the rear axle. The dimensions of a stamping blank for the fastening device are correspondingly determined essentially by the distance between the two mountings for a brake hose, and by the distance between the receptacle and the connecting arms of the brake hose mounting.

In summary, one aspect of the invention resides in a shock absorber comprising: a sealed cylinder defining a chamber therein; the cylinder containing a damping fluid; a piston rod sealingly projecting into the cylinder and being axially displaceable with respect to the cylinder; a piston attached to the piston rod, the piston rod being disposed with the cylinder to sealingly divide the chamber into first and second chambers; means for permitting flow of damping fluid between the first and second chambers; a longitudinal axis; an outer tube being oriented along the longitudinal axis, the outer tube having an external surface; the piston rod and the chamber being disposed radially inwardly of the external surface of the outer tube; singular fastening means comprising: first means for fastening to a first external object; second means for fastening to a second external object; the singular fastening means being a single, integral unit comprising the first fastening means and the second fastening means; the singular fastening means being positioned on the external surface of the outer tube at a predetermined location on the external surface of the outer tube and being aligned along the longitudinal axis of the shock absorber in a predetermined position; and the singular fastening means being fixedly attached, as a single, integral unit, to the external surface of the outer tube of the shock absorber at the predetermined location and the predetermined position.

Another aspect of the invention resides broadly in a method of making a shock absorber, the shock absorber having a longitudinal axis, the method comprising the steps of: providing a sealed cylinder, the sealed cylinder defining a chamber therein, the cylinder containing a damping fluid; providing a piston rod, the piston rod sealingly projecting into the cylinder and being axially displaceable with respect to the cylinder; providing a piston, the piston being attached to the piston rod, the piston rod being disposed with the cylinder to sealingly divide the chamber into first and second chambers; providing means for permitting flow of damping fluid between the first and second chambers; providing an outer tube, the outer tube being oriented along the longitudinal axis, the outer tube having an external surface, the piston rod and the chamber being disposed radially inwardly of the external surface of the outer tube; the method further comprising the additional steps of: providing singular fastening means, the singular fastening means comprising: first means for fastening to a first external object; second means for fastening to a second external object; the singular fastening means being a single, integral unit comprising the first fastening means and the second fastening means; positioning the singular fastening means on the external surface of the outer tube at a predetermined location on the external surface of the outer tube and aligning the singular fastening means in a predetermined position along the longitudinal axis of the shock absorber; and fixedly attaching the singular fastening means, as a single, integral unit, to the external surface of the outer tube of the shock absorber at the predetermined location and the predetermined position.

Yet another aspect of the invention resides broadly in a shock absorber having a longitudinal axis, the shock absorber being made by a method comprising the steps of: providing a sealed cylinder, the sealed cylinder defining a chamber therein, the cylinder containing a damping fluid; providing a piston rod, the piston rod sealingly projecting into the cylinder and being axially displaceable with respect to the cylinder; providing a piston, the piston being attached to the piston rod, the piston rod being disposed with the cylinder to sealingly divide the chamber into first and second chambers; providing means for permitting flow of damping fluid between the first and second chambers; providing an outer tube, the outer tube being oriented along the longitudinal axis, the outer tube having an external surface, the piston rod and the chamber being disposed radially inwardly of the external surface of the outer tube; the method further comprising the additional steps of: providing singular fastening means, the singular fastening means comprising: first means for fastening to a first external object; second means for fastening to a second external object; the singular fastening means being a single, integral unit comprising the first fastening means and the second fastening means; positioning the singular fastening means on the external surface of the outer tube at a predetermined location on the external surface of the outer tube and aligning the singular fastening means in a predetermined position along the longitudinal axis of the shock absorber; and fixedly attaching the singular fastening means, as a single, integral unit, to the external surface of the outer tube of the shock absorber at the predetermined location and the predetermined position.

BRIEF DESCRIPTION OF THE DRAWINGS

The invention and its advantages are explained in greater detail below, with reference to the accompanying figures, wherein:

FIGS. 1a-b illustrate an outer tube with a fastening device according to the present invention;

DESCRIPTION OF THE PREFERRED EMBODIMENTS

Figure 1B:
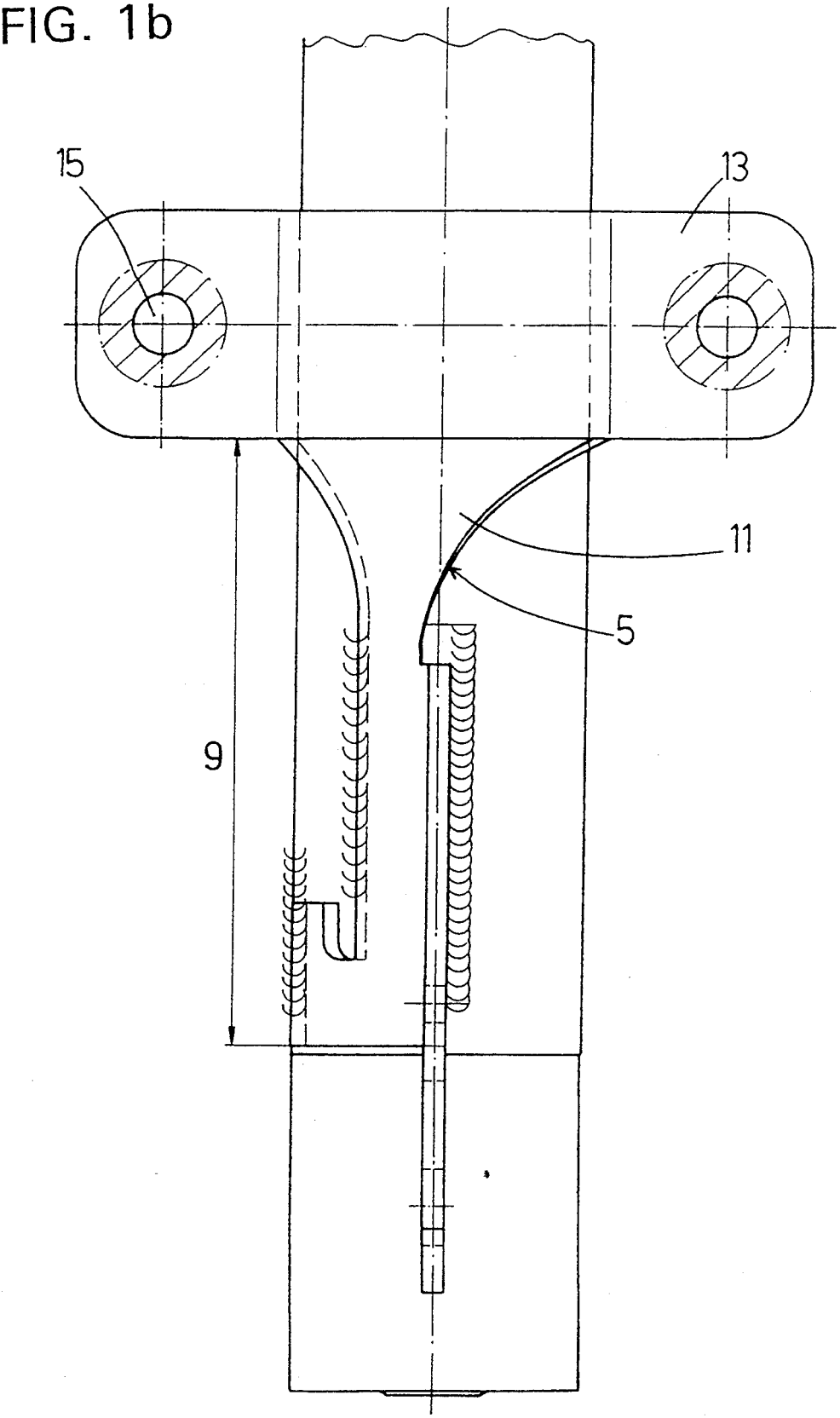

FIGS. 1a and 1b illustrate an outer tube 1 for a shock absorber 3, which in this case is illustrated as a telescoping strut. A fastening device 5 is welded to its lower end. The fastening device 5 comprises, among other things, a receptacle 7 for a steering stub axle (not shown) of a motor vehicle. In the vicinity of the receptacle 7, the fastening device is preferably designed as a flat body. The receptacle 7 is connected to a connecting web 9. The width of this connecting web 9 preferably represents an essentially ring-shaped section 11, the inside diameter of which is preferably adapted to the outside diameter of the outer tube 1. The upper end of the fastening device 5 is preferably formed by a roll stabilizer mounting 13.

The one-piece design of the fastening device 5 makes it possible to achieve substantially exact dimensions and to observe tolerances for the distance between the receptacle 7 and the holes 15 of the roll stabilizer 13 much more closely than in other known devices.

There are also advantages in terms of the usable length of the weld seams. The connecting web 9, which runs essentially in the axial direction, offers many possible applications without any risk of distortion. The connecting web 9 can also permanently increase the rigidity of the fastening device 5.

In the illustrated configuration, the size of the stamping blank used for producing the fastening device can be determined essentially by the distance between the holes 15 of the roll stabilizer mounting 13 and the receptacle 7.

Figure 2C:
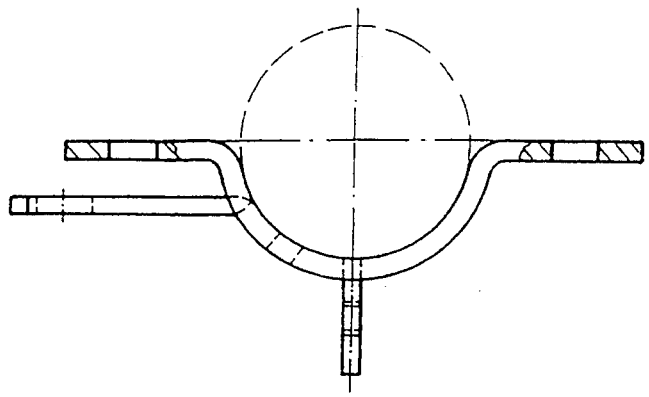
FIGS. 2a-c illustrate the fastening device separately.
Figure 2A:
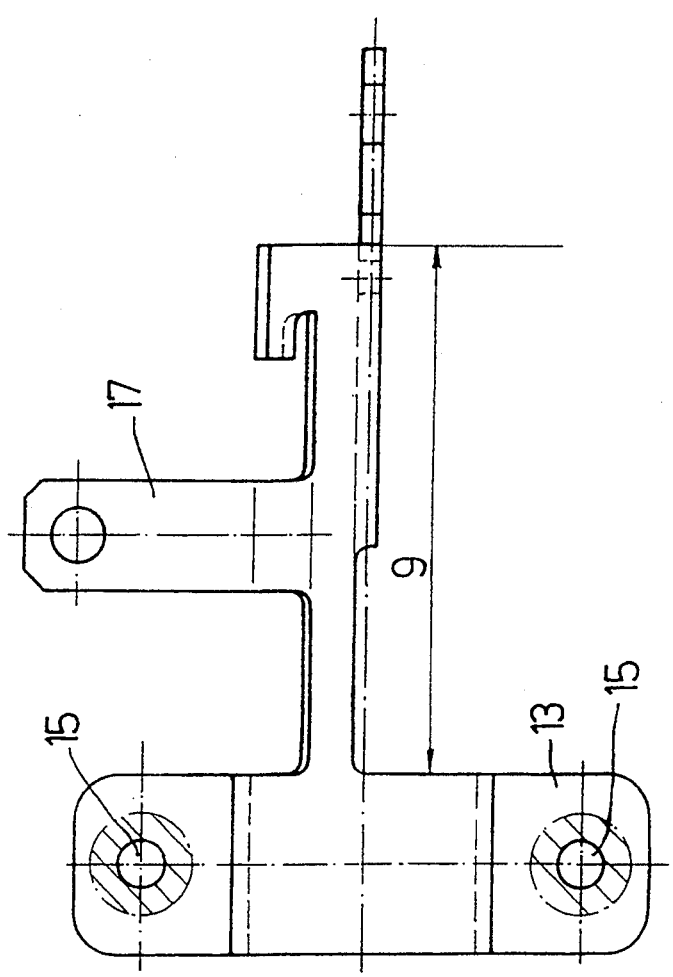
Figure 2B:
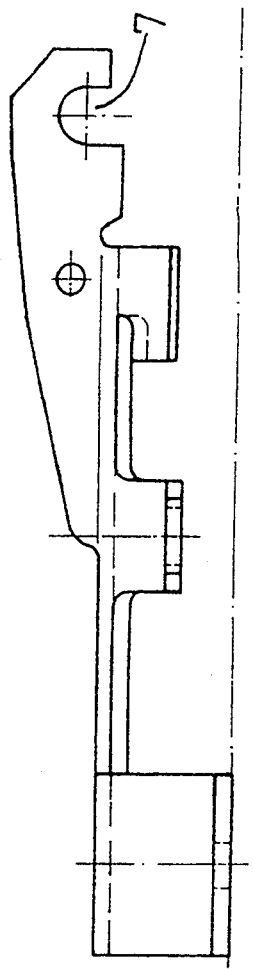

FIGS. 2a-c show a fastening device in isolation, like the one illustrated in FIGS. 1a and 1b. An additional component in FIG. 2 is a brake hose holder 17, which can alternatively be used to hold a brake wear indicator. In the circumferential direction, brake hose holder 17 encloses, that is, surrounds, the connecting web 9, whereby the length is selected so that in its development, it does not increase the width of the stamping blank.

FIGS. 3a-d show a fastening device 5, in particular as used for a shock absorber on a rear axle.

The receptacle 7 for the steering stub axle is essentially identical to those in the embodiments illustrated in FIGS. 1a, 1b, and 2a-2c. A brake hose mounting 17 is preferably used, which in turn is preferably coupled to the receptacle 7 by means of a connecting web 9. The connecting web 9 preferably includes a flat section which makes the transition into a ring-shaped section, to which are attached the mountings 17 for the brake hoses or ABS.

Figure 3A:
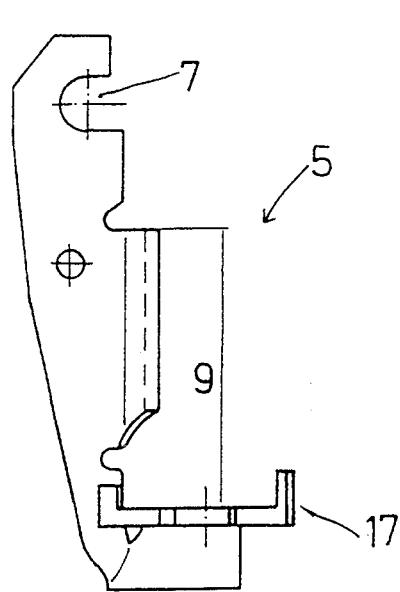
FIGS. 3a-d also illustrate the fastening device separately.
Figure 3D:
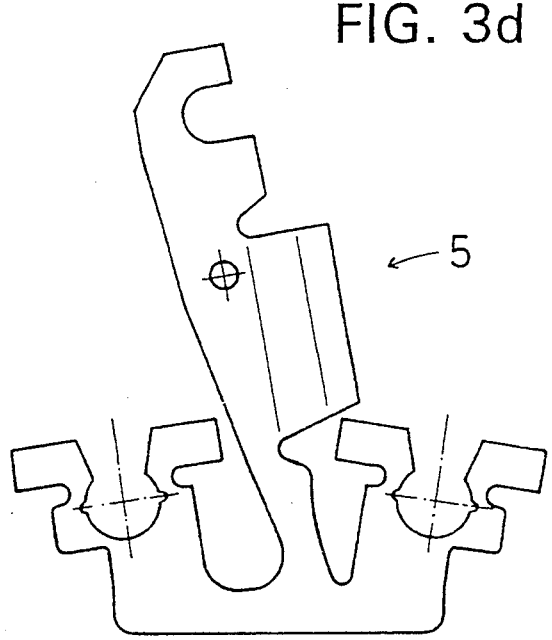
Figure 3B:
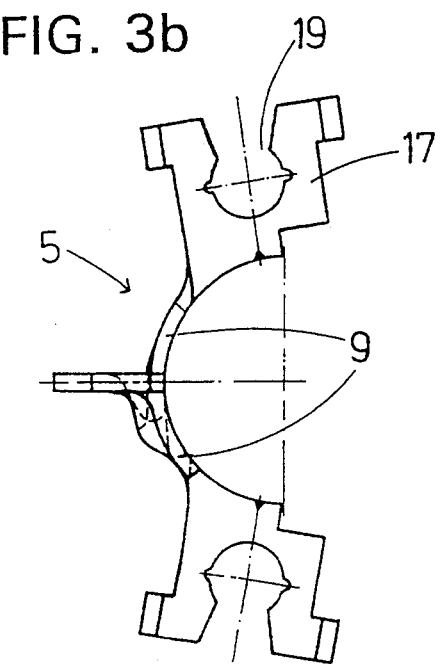
Figure 3C:
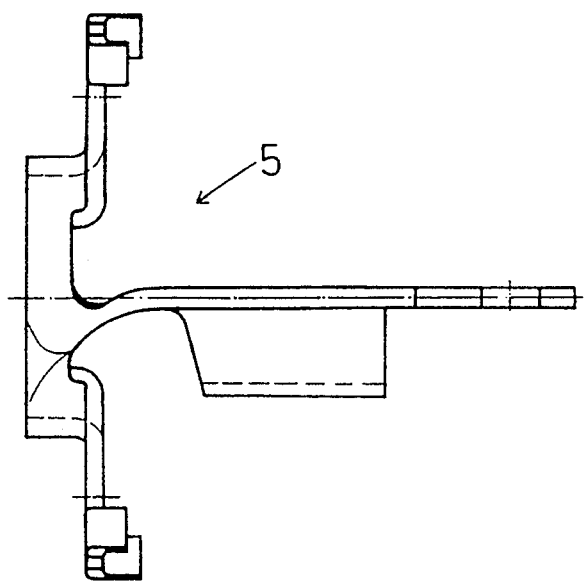

FIG. 3d shows very clearly the dimensions for a stamping blank. Essentially, the most important dimension is essentially the distance between the receptacle 7 and the brake house mounting 17 and the notches 19 of the brake hose mounting 17.

The disclosure now turns to a more detailed discussion of the preferred embodiments of the present invention.

In accordance with a preferred embodiment of the present invention, as shown in FIGS. 1a, 1b, 4a and 4b, fastening device 5 may preferably include a receptacle 7 for a steering stub axle of a motor vehicle and a roll stabilizer mounting 13. Receptacle 7 and roll stabilizer mounting 13 are preferably rigidly connected to one another via connecting web 9. A longitudinal axis 20 is preferably defined through the shock absorber in question and therefore through outer tube 1.

Figure 4A:
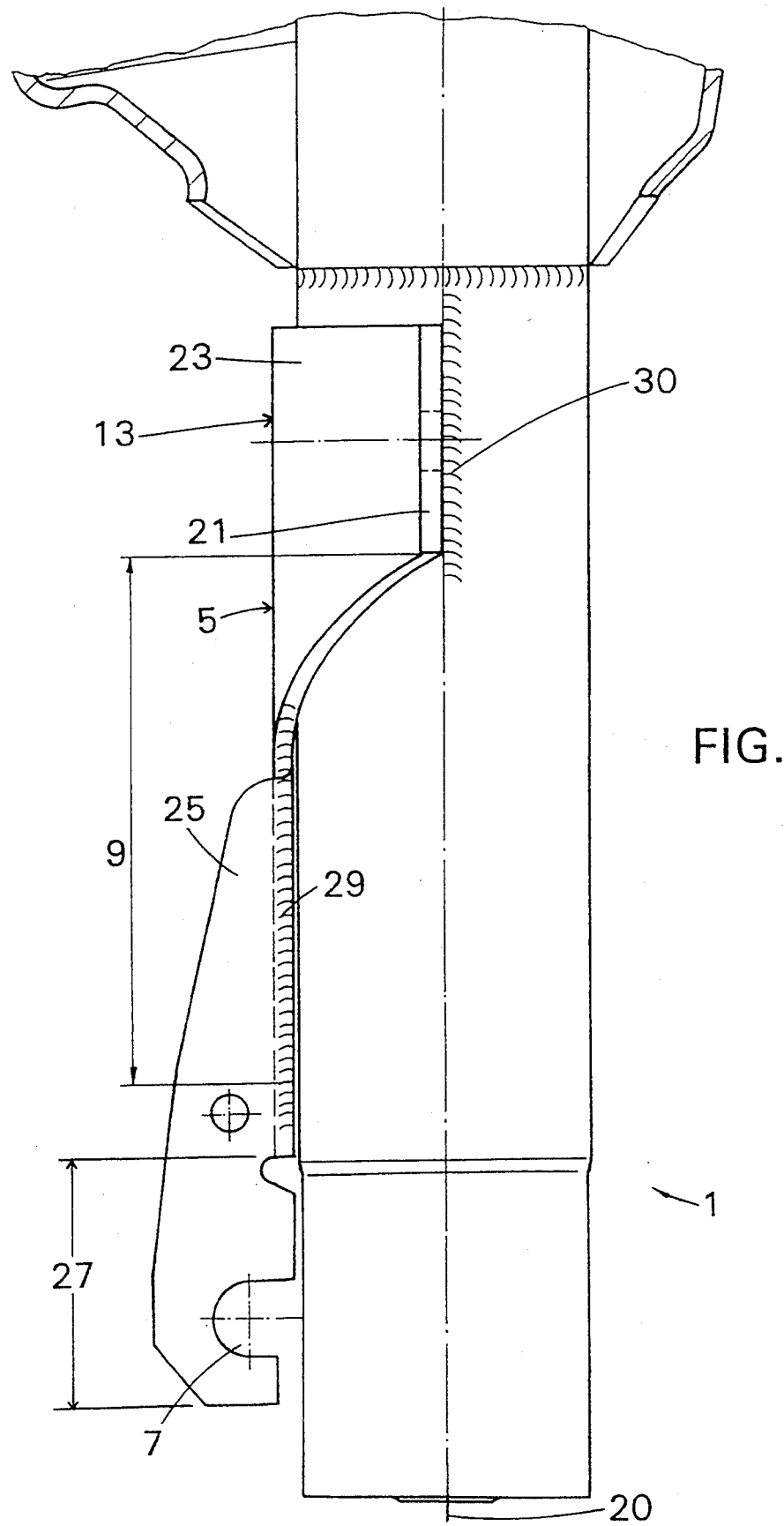
FIGS. 4a and 4b are, respectively, substantially the same views as FIGS. 1a and 1b, but illustrate additional components.
Figure 4B:
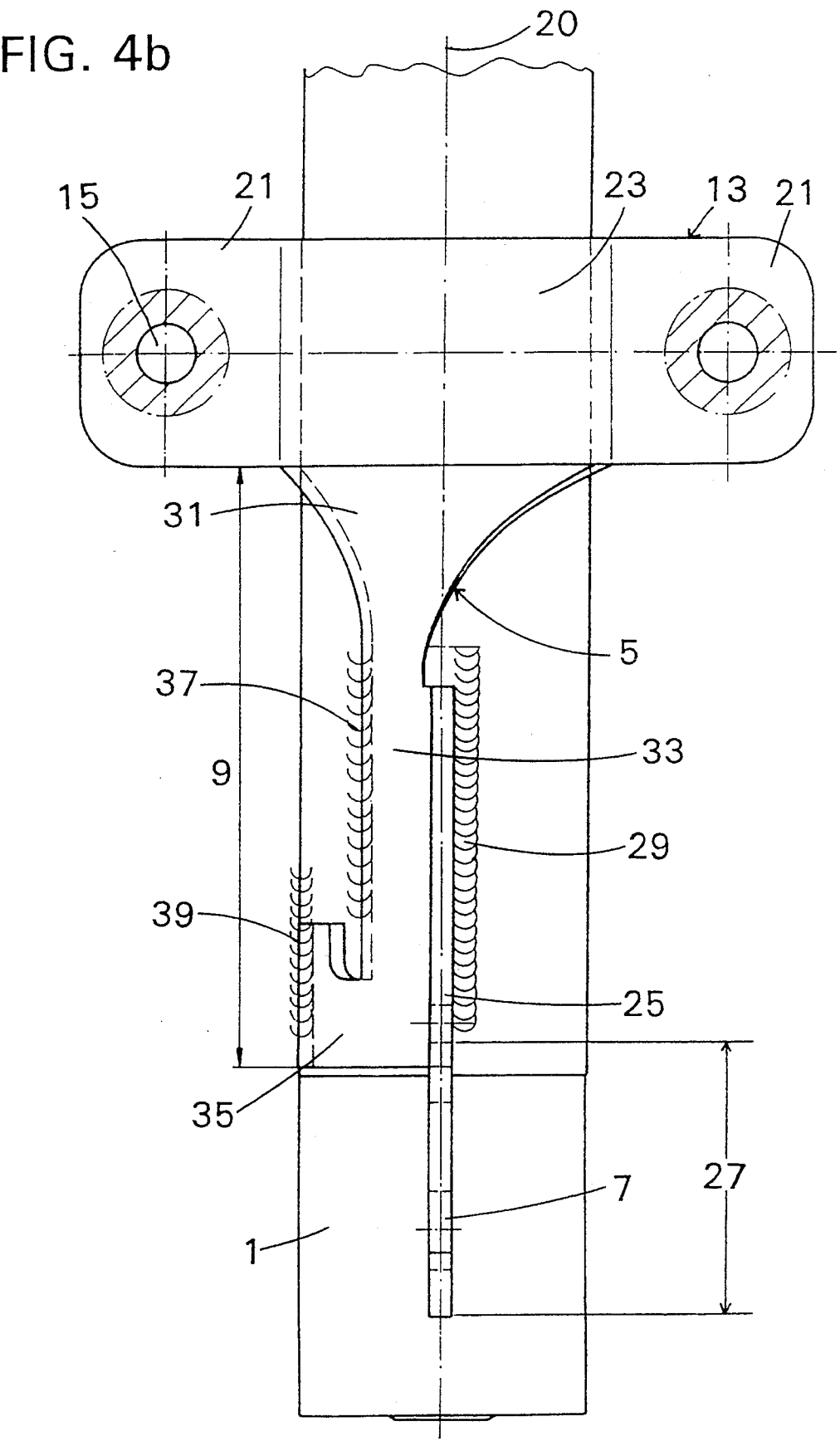
Figure 5C:
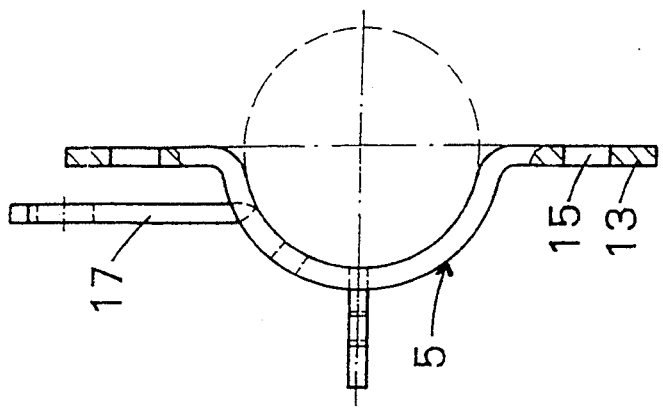
FIGS. 5a-5c are, respectively, substantially the same views as FIGS. 2a-2c, but illustrate additional components.
Figure 5B:
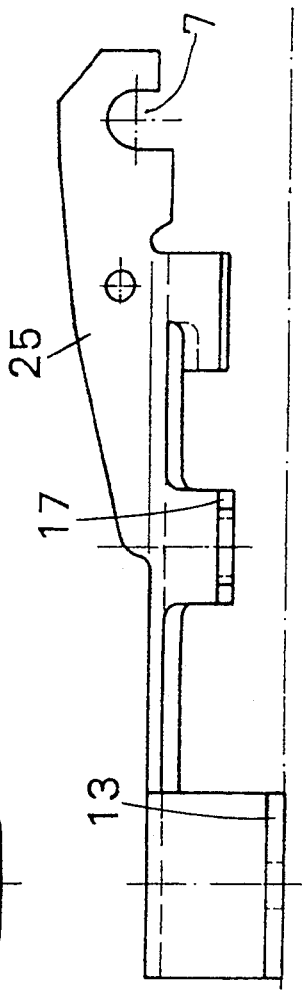
Figure 5A:
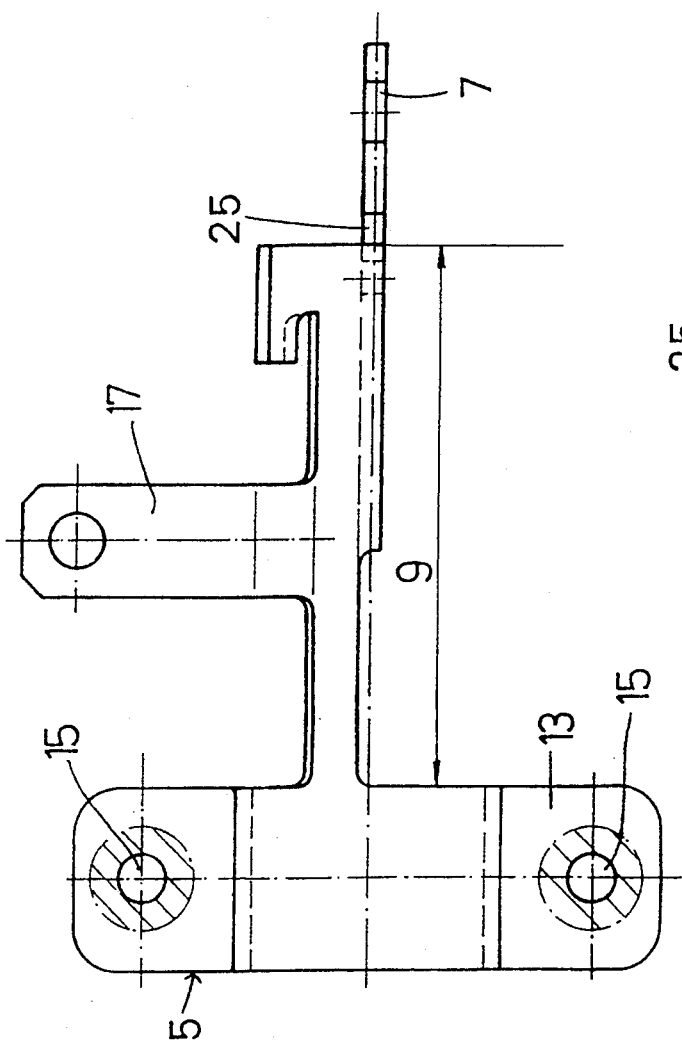

As shown in FIGS. 4a and 4b, roll stabilizer mounting 13 may preferably be embodied by two flat and coplanar sections 21 and a semiannular section 23 interconnecting the flat sections 21. A hole 15 is preferably disposed through each of the flat sections 21. Semiannular section 23 is preferably configured to interface in close contact with the external cylindrical surface of outer tube 1 of shock absorber 3, over about half of the circumferential extent of the external cylindrical surface of outer tube 1. Thus, the inner diameter of semiannular section 23 preferably essentially corresponds to the outer diameter of outer tube 1.

As shown, receptacle 7 is preferably indented into a longitudinal extension 25 of fastening device 5. Longitudinal extension 25 is preferably configured for being oriented longitudinally along the longitudinal extent of outer tube 1. Longitudinal extension 25 itself preferably lies in a plane which is parallel to the longitudinal axis 20 of outer tube 1 and shock absorber 3 and perpendicular to the plane in which flat sections 21 of roll stabilizer mounting 13 lie.

Preferably, in accordance with a preferred embodiment of the present invention, receptacle 7 may be indented into a lower portion 27 of longitudinal extension 25 of fastening device 5. Preferably, as shown, a major portion of longitudinal extension 25 of fastening device 5, and, accordingly, of connecting web 9, can be welded onto outer tube 1 by way of a longitudinal weld 29 whereas the aforementioned lower portion 27 is not. Thus, lower portion 27 of longitudinal extension 25 of fastening device 5 is preferably not in contact with the external surface of outer tube 1 and can preferably be slightly spaced apart therefrom. Receptacle 7 may preferably be embodied by a generally semi-circular slot, wherein the open portion of the slot faces outer tube 1 and opens into the space between lower portion 27 of lower portion 27 of fastening device 5 and the external cylindrical surface of outer tube 1. Roll stabilizer mounting 13 can preferably be welded onto outer tube 1 by way of longitudinal welds 30, one of which is shown in FIG. 4a.

Connecting web 9 is preferably configured to run longitudinally along outer tube 1 to connect roll stabilizer mounting 13 and longitudinal extension 25. As such, connecting web 9 is preferably embodied by a transition portion 31, an elongated neck portion 33 and a terminal portion 35. Neck portion 33 is preferably of a reduced circumferential extent, such as about 30 to 60 degrees, while transition portion 31 preferably rigidly connects semiannular portion 23 with neck portion 33 while making a smooth, curved transition between semiannular portion 23 and neck portion 33. A major portion of neck portion 33 is preferably welded to outer tube 1 by a second longitudinal weld 37, as shown. Terminal portion 35 preferably has a circumferential extent of about between 30 and 90 degrees, preferably greater than that of neck portion 33, and is preferably welded to outer tube 1 by way of a third longitudinal weld 39. Preferably, as shown, longitudinal extension 25, especially lower portion 27 thereof, extends a significant distance longitudinally beyond terminal portion 35 of connecting web 9.

It will be appreciated that the distance between holes 15 of roll stabilizer mounting 13, as well as the longitudinal distance between holes 15 and receptacle 7, can essentially serve as parameters for determining the size of the stamping blank for forming the fastening device 5 according to the present invention.

FIGS. 2a–2c and 5a–5c illustrate, in isolation, the fastening device 5 shown in FIGS. 1a, 1b, 4a and 4b. As shown, in accordance with another preferred embodiment of the present invention, a brake hose holder 17 may be included as part of fastening device 5. As shown, brake hose holder 17 may preferably be located between roll stabilizer mounting 13 and lower portion 25 of fastening device 5. Preferably, the length of the brake hose holder 17 can be chosen such that the width of the stamping blank used to form the fastening device is not increased.

FIGS. 3a–3d and 6a–6d illustrate a fastening device 5 which may preferably be utilized on a rear axle. Particularly, the fastening device 5 illustrated in FIGS. 3a–3d and 6a–6d does not have a roll stabilizer mounting.

Preferably, in the embodiment illustrated in FIGS. 3a–3d and 6a–6d, the receptacle 7 for the steering stub axle is essentially identical to that illustrated for the embodiment of FIGS. 1a, 1b, 4a and 4b, and that of FIGS. 2a–2c and 5a–5c. As shown, a brake hose holder, or mounting, 17 may preferably be included. Thus, in accordance with a preferred embodiment of the present invention, brake hose mounting 17 is preferably connected to receptacle 7 by means of connecting web 9.

Figure 6A:
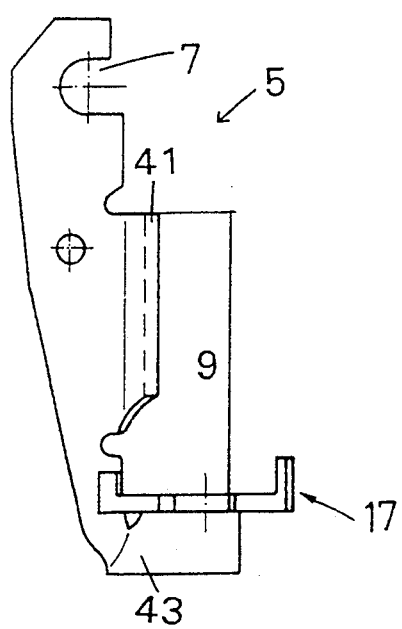
FIGS. 6a-6d are, respectively, substantially the same views as FIGS. 3a-3d, but illustrate additional components.
Figure 6D:
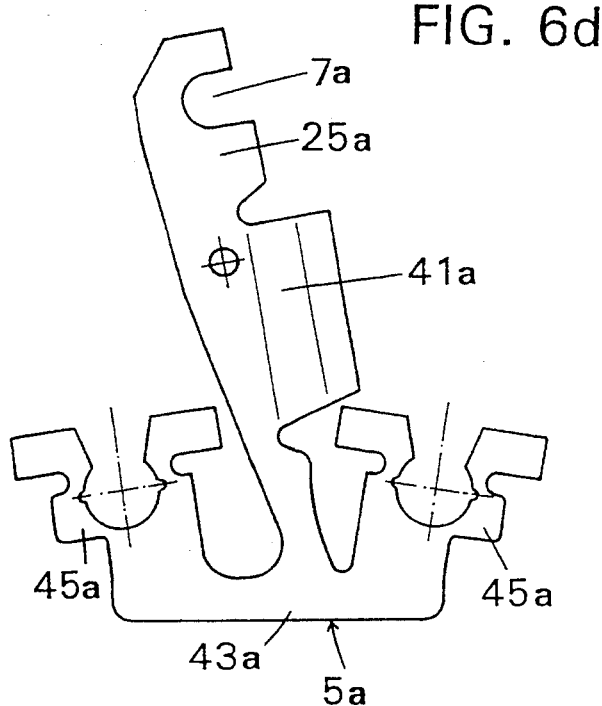
Figure 6B:
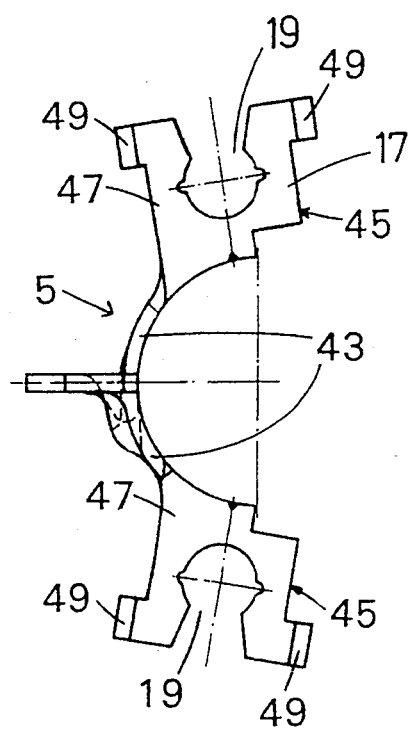
Figure 6C:
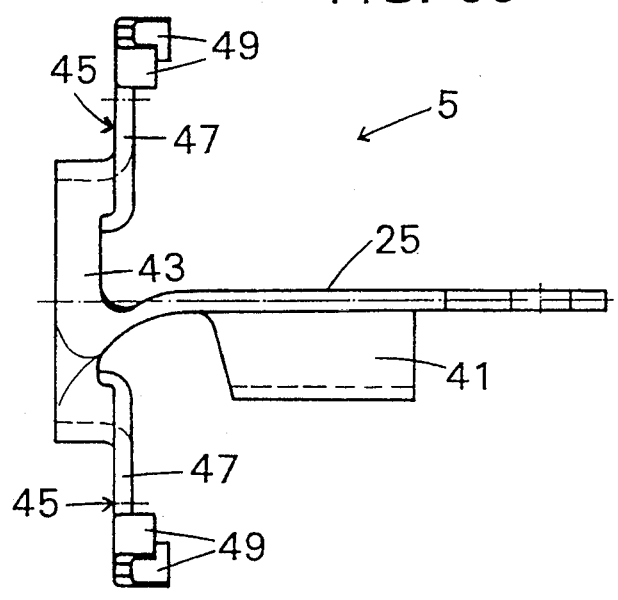

As illustrated in FIGS. 6a–6c, connecting web 9 may preferably be embodied by a longitudinal extension 25, an arcuate portion 41 extending from longitudinal extension 25, and a lower, semiannular portion 43. Longitudinal extension 25, with receptacle 7 indented therein, may preferably be configured similarly to the longitudinal extension 25 of the embodiment of FIGS. 1a, 1b, 4a and 4b. Accordingly, longitudinal extension 25 can preferably be configured so as to be oriented along a radius of the shock absorber in question when placed on the shock absorber. Arcuate portion 41 preferably extends from a base of longitudinal extension 25, that is, from that portion of longitudinal extension 25 which will be adjacent outer tube 1 (not shown), and preferably describes an arc of about 90°. When mounted on outer tube 1 (not shown), arcuate portion 41 will preferably interface in close contact with outer tube 1. Accordingly, the arc described by arcuate portion 41 preferably has a diameter roughly corresponding to that of the outer tube 1 on which the fastening device 5 is to be mounted.

Brake hose mounting 17 can preferably be embodied by two mounting portions 45, each of which preferably extends from semiannular portion 43. Each mounting portion preferably includes a base portion 47, wherein each base portion 47 is preferably configured to generally lie in a plane perpendicular to the longitudinal axis of outer tube 1 and perpendicular to the plane defined by longitudinal extension 25. Notches 19 are preferably embodied by generally circular holes, with a notch-like indentation opening into the circular hole. Notches 19 are preferably indented into base portions 47.

Preferably extending from each base portion 47, in a direction parallel to the longitudinal axis of the outer tube, are flange portions 49. Each mounting portion 45 preferably includes two such flange portions 49, and each flange portion 49 preferably extends towards receptacle 7.

As shown in FIG. 6b, the centers of the circular portions of notches 19 are preferably not aligned along a common axis, but are preferably aligned along axes which form a shallow acute angle, such as an angle of between about 3° and about 15°, with respect to each other. In an alternative embodiment of the present invention, the centers of the circular portions of notches 19 may be aligned along a common axis.

FIG. 6d illustrates a stamping blank 5a which may preferably be utilized to form, i.e. by bending, the fastening blank 5 shown in FIGS. 6a-6c. Portions 25a, 41a, 43a and 45a for forming, respectively, longitudinal extension 25, arcuate portion 41, semiannular portion 43 and mounting portions 45, are illustrated. Portion 25a preferably includes receptacle 7a, as shown. It will be appreciated that the longitudinal distance between receptacle 7a and brake hose mountings 45a, as well as the distance between notches 19a, can preferably serve as important parameters for determining the size of stamping blank 5a.

Figure 7:
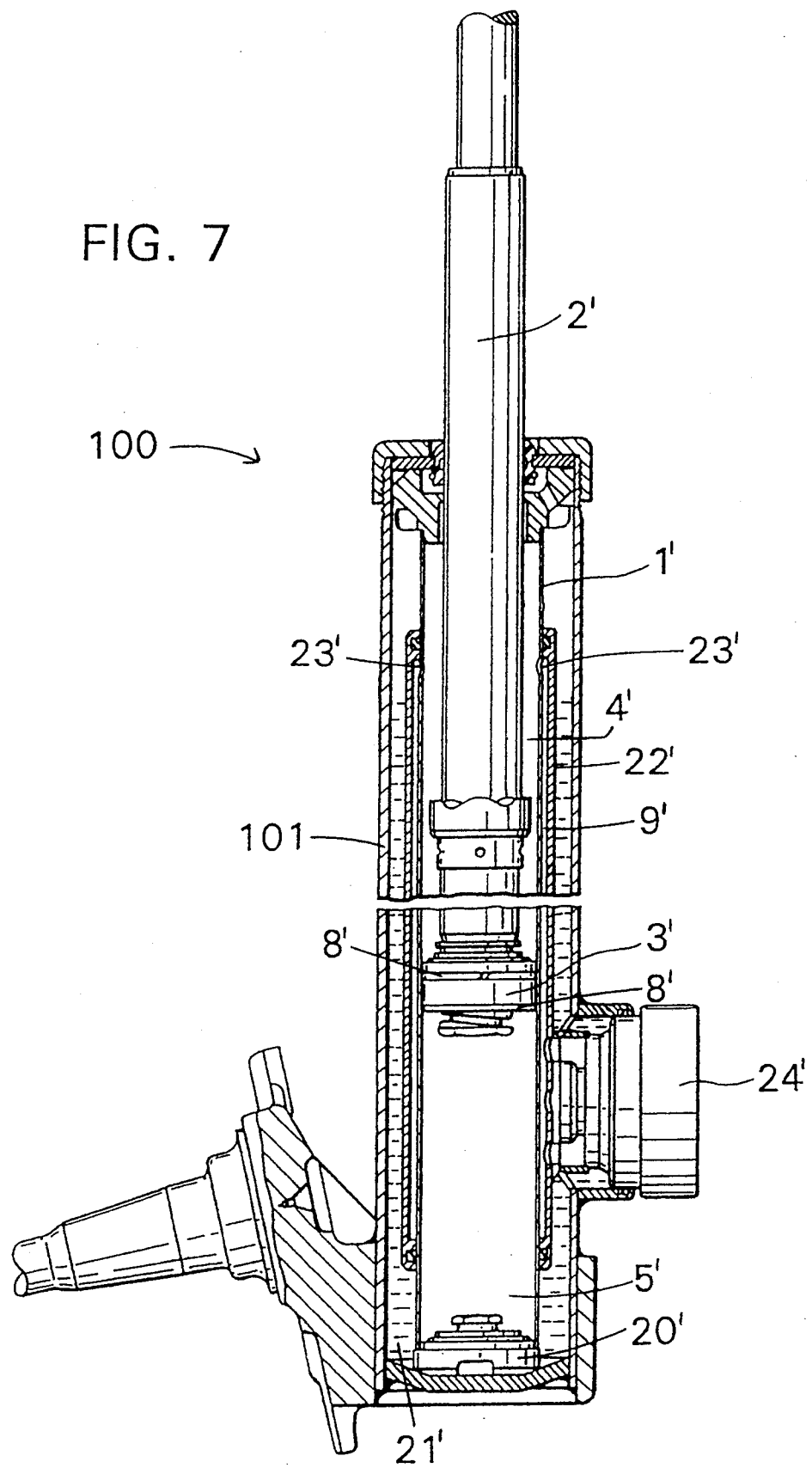
FIG. 7 illustrates a shock absorber which may be utilized in accordance with the embodiments of the present invention.

FIG. 7 illustrates a shock absorber 100, having an outer tube 101, which may be utilized in accordance with the embodiments of the present invention. As illustrated in FIG. 6, an adjustable two-tube shock absorber can generally include a cylinder 1', which sealingly contains a hydraulic fluid, a piston rod 2', which piston rod 2' can sealingly project into cylinder 1' and which piston rod 2' can be axially displaceable with respect thereto, and a damping piston 3', which damping piston 3' can be sealingly disposed within cylinder 1' and can be connected to piston rod 2'. Piston rod 2' can be attached to a structure portion, e.g., of a vehicle, which is not shown. Piston 3' can divide cylinder 1' into upper and lower working chambers 4' and 5', respectively, and can be provided with axially throughgoing passages and associated bottle valves 8' of conventional design and well known in the art, which can provide a substantially constant and non-variable resistance to the axial displacement of piston 3' and piston rod 2'.

Two additional cylinders of progressively greater diameter, including a cylinder 22' and outer tube 101, can be disposed coaxially with cylinder 1', so as to surround cylinder 1', thereby providing two additional annular chambers, a bypass chamber 9' and an equalization chamber 21'. Bypass chamber 9' can preferably interconnect with the working chambers via orifices 23', and a valve 20', located at the bottom of cylinder 1'. The bypass chamber 9' can preferably provide a means by which the damping medium contained therein can reach equalization chamber 21'.

A damping force control unit 24', which can act hydraulically in parallel with throttle valves 8' to modify the substantially constant damping force which throttle valves 8' can provide, can be mounted as a separate component attached to the shock absorber, and can be in fluid communication with bypass 9' and equalization chamber 21'.

It should be understood that the shock absorber illustrated in FIG. 7 is provided as an example of a type of shock absorber on which the fastening device according to the present invention may be utilized, and that the fastening device according to the present invention may essentially be utilized on any appropriate shock absorber.

Based on the disclosure hereinabove, the advantages of a fastening device according to the present invention should generally be clear to a routineer in the field of the invention. It should also be appreciated that, according to another, alternative, embodiment of the present invention, a fastening device according to the present invention provides advantages during an automatic welding process. Particularly, whereas, in the case of prior known fastening devices, it would usually be necessary for two parts of a welding jig to hold separate corresponding fastening elements on the outer tube of a shock absorber during automatic welding, the single fastening element of the present invention would essentially only require that one part of a welding jig hold essentially the entire fastening element on the outer tube of a shock absorber during automatic welding. This would essentially provide advantages in terms of handling and precision.

One feature of the invention resides broadly in the fastening device on the outer tube of a shock absorber, comprising a receptacle for the connection to a vehicle axle and, optionally or in combination, additional mountings for a roll stabilizer and for brake hoses, whereby the connection and the additional mountings are at a distance from one another, characterized by the fact that the receptacle 7 and the mountings 13, 17 are components of a one-piece fastening device 5, whereby the distance between the receptacle 7 and the additional mountings is bridged by a connecting web.

Another feature of the invention resides broadly in the fastening device, characterized by the fact that the width of the connecting web 9 represents a ring-shaped section 11, whereby the inside diameter is adapted to the outside diameter of the outer tube 1.

Yet another feature of the invention resides broadly in the fastening device, characterized by the fact that the dimensions of a stamping blank for the fastening device 5 are determined essentially by the distance between the two locator holes 15 for the stabilizer and by the distance between the receptacle 7 and the horizontal center axis of the locator holes 15.

Still another feature of the invention resides broadly in the fastening device, characterized by the fact that the dimensions of a stamping blank for the fastening device 5 are determined essentially by the distance between the two mountings 17 for a brake hose and by the distance between the receptacle 7 and the connecting web 9 of the brake hose holder 17.

Examples of shock absorbers, which may be utilized in accordance with the embodiments of the present invention, may be found in the following U.S. Pat. No. 4,669,586 to Mettler, entitled "Pipe-Type Housing for a Shock Absorber Particularly of the Telescopic Vibration Damper Type"; U.S. Pat. No. 4,660,436 to Davoust and Pelus, entitled "Viscous Vibration Dampers"; and U.S. Pat. No. 3,901,359 to Jentsch, entitled "Hydraulic Twin-Tube Vibration Damper".

Examples of automatic welding arrangements, which may be utilized in accordance with the embodiments of the present invention, may be found in the following U.S. Pat. Nos. 4,377,024, which issued to Saperstein on Mar. 22, 1983; 4,229,641, which issued to Ihara on Oct. 21, 1980; 4,213,555, which issued to Minkiewicz et al. on Jul. 22, 1980; 4,112,289, which issued to Mead et al. on Sep. 5, 1978; and 3,964,665, which issued to Cervenka et al. on Jun. 22, 1976.

Examples of jig arrangements for automatic welding, which may be utilized in accordance with the embodiments of the present invention, may be found in the following U.S. Pat. Nos. 4,667,866, which issued to Tobita et al. on May 26, 1987; 4,593,850, which issued to Ariga et al. on Jun. 10, 1986; and 4,400,607, which issued to Wakou et al. on Aug. 23, 1983.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber comprising:

a sealed cylinder defining a chamber therein;

said cylinder containing a damping fluid;

a piston rod sealingly projecting into said cylinder and being axially displaceable with respect to said cylinder;

a piston attached to said piston rod, said piston being disposed within said cylinder to sealingly divide said chamber into first and second chambers;

means for permitting flow of damping fluid between said first and second chambers;

a longitudinal axis;

an outer tube being oriented along said longitudinal axis, said outer tube having an external surface;

said piston rod and said chamber being disposed radially inwardly of said external surface of said outer tube;

singular, unitary, homogenous, one-piece fastening means comprising:

first means for fastening to a first external object;

second means for fastening to a second external object;

said singular, unitary, homogenous, one-piece fastening means being a single, integral unit comprising said first fastening means and said second fastening means, said singular, unitary, homogenous, one-piece fastening means being a single, continuous, one-piece part formed from a single, one-piece stamping blank of one piece of sheet material;

said singular, unitary, homogenous, one-piece fastening means being positioned on said external surface of said outer tube at a predetermined location on said external surface of said outer tube and being aligned along the longitudinal axis of said shock absorber in a predetermined position; and said singular, unitary, homogenous, one-piece fastening means being fixedly attached, as a single, integral unit, to said external surface of said outer tube of said shock absorber at said predetermined location and said predetermined position.

2. The shock absorber according to claim 1, wherein said singular fastening means is welded to said external surface of said outer tube of said shock absorber at said predetermined location and said predetermined position.

3. The shock absorber according to claim 2, wherein:

said first fastening means comprises at least one of:

means for mounting a roll stabilizer; and means for mounting at least one hose;

said second fastening means comprises means for being fastened to a vehicle axle; and said singular fastening means comprises web means rigidly connecting said first fastening means and said second fastening means, said web means being aligned parallel to the longitudinal axis of said shock absorber.

4. The shock absorber according to claim 3, wherein:

said web means comprises at least one arcuate portion;

each said at least one arcuate portion having an inner radius with respect to the longitudinal axis of said shock absorber;

said outer tube of said shock absorber having an outer radius;

said inner radius of each said at least one arcuate portion of said connecting web being roughly equal to said outer radius of said outer tube of said shock absorber and being configured to provide a close interfacing contact between each said at least one arcuate portion of said web means and said external surface of said outer tube.

5. The shock absorber according to claim 4, further comprising:

said first fastening means comprising means for mounting a roll stabilizer;

said means for mounting a roll stabilizer comprising two flat and coplanar portions and a semiannular portion, said flat and coplanar portions each extending from opposite ends of said semiannular portion in a radial direction away from said shock absorber;

each of said flat coplanar portions having a hole;

said at least one arcuate portion of said web means comprising three portions, said three portions comprising a transition portion, a neck portion and a terminal portion;

said transition portion extends from said semiannular portion of said means for mounting a roll stabilizer;

said neck portion is aligned parallel to the longitudinal axis of said shock absorber;

said terminal portion extends from said neck portion;

said neck portion describes an arc of between about 30° and about 60° about the longitudinal axis of said shock absorber;

said transition portion has a first end and a second end, said first end being directly adjacent said semiannular portion of said means for mounting a roll stabilizer and describing an arc of about 180° about the longitudinal axis of said shock absorber, said second end being directly adjacent said neck portion and describing an arc, corresponding to that described by said neck portion, about the longitudinal axis of said shock absorber;

said neck portion describes a varying arc about the longitudinal axis of said shock absorber, said varying arc varying as a function of longitudinal position between said first end and said second end;

said neck portion having two opposite edge portions, said varying arc being defined between said two opposite edge portions, each of said two opposite edge portions being concave;

said web means further comprising a longitudinal extension, said longitudinal extension comprising said second fastening means;

said longitudinal extension is aligned parallel to the longitudinal axis of said shock absorber and extends in a radial direction away from said shock absorber;

said longitudinal extension is oriented perpendicular with respect to said flat coplanar portions of said means for mounting a roll stabilizer;

a major portion of said longitudinal extension is integral with said neck portion and said terminal portion;

said longitudinal extension comprises a lower portion extending longitudinally beyond said terminal portion of said web means;

said lower portion comprises said means for being fastened to a vehicle axle, said means for being fastened comprises a receptacle for accommodating a vehicle axle;

said receptacle comprises a recessed portion being indented into said lower portion of said longitudinal extension;

said lower portion of said longitudinal extension and said external surface of said outer tube defining a gap therebetween;

said recessed portion having an open end facing said gap defined between said lower portion of said longitudinal extension and said external surface of said outer tube;

said terminal portion of said web means extending circumferentially from said neck portion and describing an arc of between about 30° and about 90° about the longitudinal axis of said shock absorber;

said terminal portion initiating from said neck portion circumferentially remote from said longitudinal extension;

said terminal portion comprising a circumferential portion and a longitudinal flange portion;

each of said circumferential portion and said longitudinal flange portion having a longitudinal dimension defined parallel to the longitudinal axis of said shock absorber;

said longitudinal flange portion extending longitudinally in a direction towards said first fastening means;

said longitudinal flange portion having a greater longitudinal dimension than said circumferential portion;

said longitudinal flange comprising a remote longitudinal edge, said longitudinal edge being remote from said neck portion of said web means; and said singular fastening means being welded to said outer tube by five longitudinal welds, each of said five longitudinal welds being oriented parallel to the longitudinal axis of said shock absorber, said five longitudinal welds comprising:

first and second longitudinal welds welding said first attachment means to said outer tube;

said first longitudinal weld being disposed at one end of said semiannular portion;

said second longitudinal weld being disposed at an opposite end of said semiannular portion;

third, fourth and fifth longitudinal welds welding said web means to said outer tube;

said third longitudinal weld being disposed along a first longitudinal edge of said neck portion of said web means;

said fourth longitudinal weld being disposed along a second, opposite longitudinal edge of said neck portion of said web means and extending along said major portion of said longitudinal extension; and said fifth longitudinal weld being disposed along said remote longitudinal edge of said longitudinal flange of said terminal portion of said web means.

6. The shock absorber according to claim 5, wherein:

said singular fastening means further comprises third fastening means;

said third fastening means comprising means for holding a brake hose;

said means for holding a brake hose being disposed between said first fastening means and said second fastening means along the longitudinal extent of said singular fastening means;

said means for holding a brake hose extending from said neck portion of said web means;

said means for holding a brake hose comprising:

a circumferential portion extending circumferentially from said neck portion of said web means, said circumferential portion describing an arc of between about 30° and about 60° about the longitudinal axis of said shock absorber;

a lateral portion extending from said circumferential portion, said lateral portion being parallel to said flat coplanar portions of said means for mounting a roll stabilizer; and a hole for accommodating a brake hose, said hole being disposed through said lateral portion;

said circumferential portion of said terminal portion of said web means;

describing an arc of between about 30° and about 60° about the longitudinal axis of said shock absorber; and initiating from said neck portion of said web means circumferentially remote from said longitudinal extension;

said circumferential portion of said terminal portion of said web means and said circumferential portion of said means for mounting a brake hose describing equivalent arcs about the longitudinal axis of said shock absorber.

7. The shock absorber according to claim 4, further comprising:

said first fastening means comprising means for mounting two brake hoses;

said at least one arcuate portion of said web means comprising a semiannular portion;

said semiannular portion describing an arc of about 180° with respect to the longitudinal axis of said shock absorber;

said web means further comprising a longitudinal extension, said longitudinal extension comprising said second fastening means;

said longitudinal extension is aligned parallel to the longitudinal axis of said shock absorber and extends in a radial direction away from said shock absorber;

said longitudinal extension extends longitudinally from said semiannular portion;

said at least one arcuate portion of said web means further comprising an arcuate extension extending circumferentially from said longitudinal extension;

said arcuate extension describing an angle of between about 30° and about 60° with respect to the longitudinal axis of said shock absorber;

a major portion of said longitudinal extension is integral with said arcuate extension;

said longitudinal extension comprises a lower portion extending longitudinally beyond said arcuate extension;

said lower portion comprises said means for being fastened to a vehicle axle, said means for being fastened comprises a receptacle for accommodating a vehicle axle;

said receptacle comprises a recessed portion being indented into said lower portion of said longitudinal extension;

said lower portion of said longitudinal extension and said external surface of said outer tube defining a gap therebetween;

said recessed portion having an open end facing said gap defined between said lower portion of said longitudinal extension and said external surface of said outer tube;

said means for mounting two brake hoses comprising a first mounting portion and a second mounting portion;

each of said first and second mounting means comprising a base portion extending from a corresponding opposite portion of said semiannular portion of said web means in a plane perpendicular to the longitudinal axis of said shock absorber;

each said base portion comprising a notch portion for accommodating a corresponding brake hose, each said notch portion comprising a generally circular hole with a notch-like indentation opening into said generally circular hole;

each of said first and second mounting portions comprising a pair of flange portions extending from the corresponding base portion, each said flange portion extending longitudinally towards said longitudinal extension;

said arcuate extension comprises a longitudinal edge portion disposed circumferentially remote from said longitudinal extension;

said major portion of said longitudinal extension comprises a longitudinal edge portion disposed opposite said arcuate extension; and said singular fastening means being welded to said outer tube by at least two longitudinal welds, each of said at least two longitudinal welds being oriented parallel to the longitudinal axis of said shock absorber, said at least two longitudinal welds comprising:
- a first longitudinal weld disposed along said longitudinal edge portion of said arcuate extension; and
- a second longitudinal weld disposed along said longitudinal edge portion of said major portion of said longitudinal extension.

8. A method of making a shock absorber, the shock absorber having a longitudinal axis, said method comprising the steps of:

providing a sealed cylinder, the sealed cylinder defining a chamber therein, the cylinder containing a damping fluid;

providing a piston rod, the piston rod sealingly projecting into the cylinder and being axially displaceable with respect to the cylinder;

providing a piston, the piston being attached to the piston rod, the piston being disposed within the cylinder to sealingly divide the chamber into first and second chambers;

providing means for permitting flow of damping fluid between the first and second chambers;

providing an outer tube, the outer tube being oriented along the longitudinal axis, the outer tube having an external surface, the piston rod and the chamber being disposed radially inwardly of the external surface of the outer tube;

said method further comprising the additional steps of:

providing singular, unitary, homogenous, one-piece fastening means, the singular, unitary, homogenous, one-piece fastening means comprising:

first means for fastening to a first external object;

second means for fastening to a second external object;

the singular, unitary, homogenous, one-piece fastening means being a single, integral unit comprising the first fastening means and the second fastening means, the singular, unitary, homogenous, one-piece fastening means being a single, continuous, one-piece part formed from a single, one-piece stamping blank of one piece of sheet material;

positioning the singular, unitary, homogenous, one-piece fastening means on the external surface of the outer tube at a predetermined location on the external surface of the outer tube and aligning the singular fastening means in a predetermined position along the longitudinal axis of the shock absorber; and fixedly attaching the singular, unitary, homogenous, one-piece fastening means, as a single, integral unit, to the external surface of the outer tube of the shock absorber at the predetermined location and the predetermined position.

9. The method according to claim 8, wherein said step of fixedly attaching the singular fastening means comprises the step of welding the singular fastening means, as a single, integral unit, to the external surface of the shock absorber at the predetermined location and the predetermined position.

10. The method according to claim 9, wherein the first fastening means comprises one of:

means for mounting a roll stabilizer; and means for mounting at least one hose; and the second fastening means comprises means for being fastened to a vehicle axle.

11. The method according to claim 10, wherein:

said step of providing the singular fastening means comprises the step of providing web means rigidly connecting the first fastening means and the second fastening means; and said step of positioning and aligning comprises the step of aligning the web means parallel to the longitudinal axis of the shock absorber.

12. The method according to claim 11, wherein:

said step of providing the web means comprises providing at least one arcuate portion;

each of the at least one arcuate portion having an inner radius with respect to the longitudinal axis of the shock absorber;

the outer tube of the shock absorber having an outer radius;

the inner radius of each of the at least one arcuate portion of the connecting web being roughly equal to the outer radius of the outer tube of the shock absorber and being configured to provide a close interfacing contact between each of the at least one arcuate portion of the web means and the external surface of the outer tube.

13. The method according to claim 12, further comprising the steps of:

configuring the shock absorber such that:

the first fastening means comprises means for mounting a roll stabilizer;

the means for mounting a roll stabilizer comprises two flat and coplanar portions and a semiannular portion, the flat and coplanar portions each extending from opposite ends of the semiannular portion in a radial direction away from the shock absorber;

each of the flat coplanar portions has a hole;

the at least one arcuate portion of the web means comprise three portions, the three portions comprising a transition portion, a neck portion and a terminal portion;

the transition portion extends from the semiannular portion of the means for mounting a roll stabilizer;

the neck portion is aligned parallel to the longitudinal axis of the shock absorber;

the terminal portion extends from the neck portion;

the neck portion describes an arc of between about 30° and about 60° about the longitudinal axis of the shock absorber;

the transition portion has a first end and a second end, the first end being directly adjacent the semiannular portion of the means for mounting a roll stabilizer and describing an arc of about 180° about the longitudinal axis of the shock absorber, the second end being directly adjacent the neck portion and describing an arc, corresponding to that described by the neck portion, about the longitudinal axis of the shock absorber;

the neck portion describes a varying arc about the longitudinal axis of the shock absorber, the varying arc varying as a function of longitudinal position between the first end and the second end;

the neck portion having two opposite edge portions, the varying arc being defined between the two opposite edge portions, each of the two opposite edge portions being concave;

the web means further comprising a longitudinal extension, the longitudinal extension comprising the second fastening means;

the longitudinal extension is aligned parallel to the longitudinal axis of the shock absorber and extends in a radial direction away from the shock absorber;

the longitudinal extension is oriented perpendicular with respect to the flat coplanar portions of the means for mounting a roll stabilizer;

a major portion of the longitudinal extension is integral with the neck portion and the terminal portion;

the longitudinal extension comprises a lower portion extending longitudinally beyond the terminal portion of the web means;

the lower portion comprises the means for being fastened to a vehicle axle, the means for being fastened comprises a receptacle for accommodating a vehicle axle;

the receptacle comprises a recessed portion being indented into the lower portion of the longitudinal extension;

the lower portion of the longitudinal extension and the external surface of the outer tube defining a gap therebetween;

the recessed portion having an open end facing the gap defined between the lower portion of the longitudinal extension and the external surface of the outer tube;

the terminal portion of the web means extending circumferentially from the neck portion and describing an arc of between about 30° and about 90° about the longitudinal axis of the shock absorber;

the terminal portion initiating from the neck portion circumferentially remote from the longitudinal extension;

the terminal portion comprising a circumferential portion and a longitudinal flange portion;

each of the circumferential portion and the longitudinal flange portion having a longitudinal dimension defined parallel to the longitudinal axis of the shock absorber;

the longitudinal flange portion extending longitudinally in a direction towards the first fastening means;

the longitudinal flange portion having a greater longitudinal dimension than the circumferential portion; and the longitudinal flange comprising a remote longitudinal edge, the longitudinal edge being remote from the neck portion of the web means;

said step of providing the singular fastening means comprising the steps of:

providing a stamping blank;

configuring the stamping blank such that the dimensions of the stamping blank are determined by the following parameters:

the distance between the holes of the means for mounting a roll stabilizer; and the longitudinal distance between the receptacle and a line joining the holes of the means for mounting a roll stabilizer; and forming the singular fastening means from the stamping blank;

the welding step being performed with an automatic welding machine;

the welding step further comprising the steps of:

providing a welding jig, the welding jig having at least one holding portion for holding a workpiece;

aligning the welding jig adjacent the shock absorber;

holding the singular fastening means, as a single, integral unit, on the external surface of the outer tube of the shock absorber;

welding the singular fastening means to the outer tube by five longitudinal welds, each of the five longitudinal welds being oriented parallel to the longitudinal axis of the shock absorber, the five longitudinal welds comprising:

first and second longitudinal welds welding the first attachment means to the outer tube;

the first longitudinal weld being disposed at one end of the semiannular portion;

the second longitudinal weld being disposed at an opposite end of the semiannular portion;

third, fourth and fifth longitudinal welds welding the web means to the outer tube;

the third longitudinal weld being disposed along a first longitudinal edge of the neck portion of the web means;

the fourth longitudinal weld being disposed along a second, opposite longitudinal edge of the neck portion of the web means and extending along the major portion of the longitudinal extension; and the fifth longitudinal weld being disposed along the remote longitudinal edge of the longitudinal flange of the terminal portion of the web means.

14. The method according to claim 13 wherein:
the singular fastening means further comprises third fastening means;
the third fastening means comprises means for holding a brake hose;
the means for holding a brake hose is disposed between the first fastening means and the second fastening means along the longitudinal extent of the singular fastening means;
the means for holding a brake hose extends from the neck portion of the web means;
the means for holding a brake hose comprises:
  a circumferential portion extending circumferentially from the neck portion of the web means, the circumferential portion describing an arc of between about 30° and about 60° about the longitudinal axis of the shock absorber;
  a lateral portion extending from the circumferential portion, the lateral portion being parallel to the flat coplanar portions of the means for mounting a roll stabilizer; and
  a hole for accommodating a brake hose, the hole being disposed through the lateral portion;
the circumferential portion of the terminal portion of the web means:
  describes an arc of between about 30° and about 60° about the longitudinal axis of the shock absorber; and
  initiates from the neck portion of the web means circumferentially remote from the longitudinal extension;
the circumferential portion of the terminal portion of the web means and the circumferential portion of the means for mounting a brake hose described equivalent arcs about the longitudinal axis of the shock absorber.

15. The method according to claim 12, further comprising the steps of:
configuring the shock absorber such that:
  the first fastening means comprises means for mounting two brake hoses;
  the at least one arcuate portion of the web means comprises a semiannular portion;
  the semiannular portion describes an arc of about 180° with respect to the longitudinal axis of the shock absorber;
  the web means further comprises a longitudinal extension, the longitudinal extension comprising the second fastening means;
  the longitudinal extension is aligned parallel to the longitudinal axis of the shock absorber and extends in a radial direction away from the shock absorber;
  the longitudinal extension extends longitudinally from the semiannular portion;
  the at least one arcuate portion of the web means further comprising an arcuate extension extending circumferentially from the longitudinal extension;
  the arcuate extension describing an angle of between about 30° and about 60° with respect to the longitudinal axis of the shock absorber;
  a major portion of the longitudinal extension is integral with the arcuate extension;
  the longitudinal extension comprises a lower portion extending longitudinally beyond the arcuate extension;
  the lower portion comprises the means for being fastened to a vehicle axle, the means for being fastened comprises a receptacle for accommodating a vehicle axle;
  the receptacle comprises a recessed portion being indented into the lower portion of the longitudinal extension;
  the lower portion of the longitudinal extension and the external surface of the outer tube defining a gap therebetween;
  the recessed portion having an open end facing the gap defined between the lower portion of the longitudinal extension and the external surface of the outer tube;
  the means for mounting two brake hoses comprising a first mounting portion and a second mounting portion;
  each of the first and second mounting means comprising a base portion extending from a corresponding opposite portion of the semiannular portion of the web means in a plane perpendicular to the longitudinal axis of the shock absorber;
  each of the base portion comprising a notch portion for accommodating a corresponding brake hose, each of the notch portion comprising a generally circular hole with a notch-like indentation opening into the generally circular hole;
  each of the first and second mounting portions comprising a pair of flange portions extending from the corresponding base portion, each of the flange portion extending longitudinally towards the longitudinal extension;
the arcuate extension comprises a longitudinal edge portion disposed circumferentially remote from the longitudinal extension;
the major portion of the longitudinal extension comprises a longitudinal edge portion disposed opposite the arcuate extension;
said step of providing the singular fastening means comprising the steps of:
  providing a stamping blank, the stamping blank being generally flat;
  configuring the stamping blank such that the dimensions of the stamping blank are determined by the following parameters:
    the distance between the generally circular holes of the notch portions; and
    the longitudinal distance between the receptacle and a line joining the generally circular holes of the notch portions holes of the means for mounting a roll stabilizer; and
  forming the singular fastening means from the stamping blank;
  the welding step being performed with an automatic welding machine;
the welding step further comprising the steps of:
  providing a welding jig, the welding jig having at least one holding portion for holding a workpiece;
  aligning the welding jig adjacent the shock absorber;
  holding the singular fastening means, as a single, integral unit, on the external surface of the outer tube of the shock absorber;
  welding the singular fastening means to the outer tube by at least two longitudinal welds, each of the at least two longitudinal welds being oriented parallel to the longitudinal axis of the shock absorber, the at least two longitudinal welds comprising:
a first longitudinal weld disposed along the longitudinal edge portion of the arcuate extension; and
a second longitudinal weld disposed along the longitudinal edge portion of the major portion of the longitudinal extension.

16. A shock absorber having a longitudinal axis defined therethrough, said shock absorber being made by a method comprising the steps of:
providing a sealed cylinder, the sealed cylinder defining a chamber therein, the cylinder containing a damping fluid;
providing a piston rod, the piston rod sealingly projecting into the cylinder and being axially displaceable with respect to the cylinder;
providing a piston, the piston being attached to the piston rod, the piston being disposed within the cylinder to sealingly divide the chamber into first and second chambers;
providing means for permitting flow of damping fluid between the first and second chambers;
providing an outer tube, the outer tube being oriented along the longitudinal axis, the outer tube having an external surface, the piston rod and the chamber being disposed radially inwardly of the external surface of the outer tube;
said method further comprising the additional steps of:
providing singular, unitary, homogenous, one-piece fastening means, the singular, unitary, homogenous, one-piece fastening means comprising:
first means for fastening to a first external object;
second means for fastening to a second external object;
the singular, unitary, homogenous, one-piece fastening means being a single, integral unit comprising the first fastening means and the second fastening means, the singular, unitary, homogenous, one-piece fastening means being a single, continuous, one-piece part formed from a single, one-piece stamping blank of one piece of sheet material;
positioning the singular, unitary, homogenous, one-piece fastening means on the external surface of the outer tube at a predetermined location on the external surface of the outer tube and aligning the singular fastening means in a predetermined position along the longitudinal axis of the shock absorber; and
fixedly attaching the singular, unitary, homogenous, one-piece fastening means, as a single, integral unit, to the external surface of the outer tube of the shock absorber at the predetermined location and the predetermined position.

17. The shock absorber according to claim 16, wherein said method further comprises:
said step of fixedly attaching the singular fastening means comprising the step of welding the singular fastening means, as a single, integral unit, to the external surface of the shock absorber at the predetermined location and the predetermined position.

18. The shock absorber according to claim 17, wherein:
the first fastening means comprises one of:
means for mounting a roll stabilizer; and
means for mounting at least one hose; and
the second fastening means comprises means for being fastened to a vehicle axle;
said method further comprising:
said step of providing the singular fastening means comprises the step of providing web means rigidly connecting the first fastening means and the second fastening means;
said step of positioning and aligning comprises the step of aligning the web means parallel to the longitudinal axis of the shock absorber;
said step of providing the web means comprises providing at least one arcuate portion;
each of the at least one arcuate portion having an inner radius with respect to the longitudinal axis of the shock absorber;
the outer tube of the shock absorber having an outer radius;
the inner radius of each of the at least one arcuate portion of the connecting web being roughly equal to the outer radius of the outer tube of the shock absorber and being configured to provide a close interfacing contact between each of the at least one arcuate portion of the web means and the external surface of the outer tube;
said method further comprising the step of configuring the shock absorber such that:
the first fastening means comprises means for mounting a roll stabilizer;
the means for mounting a roll stabilizer comprises two flat and coplanar portions and a semiannular portion, the flat and coplanar portions each extending from opposite ends of the semiannular portion in a radial direction away from the shock absorber;
each of the flat coplanar portions has a hole;
the at least one arcuate portion of the web means comprise three portions, the three portions comprising a transition portion, a neck portion and a terminal portion;
the transition portion extends from the semiannular portion of the means for mounting a roll stabilizer;
the neck portion is aligned parallel to the longitudinal axis of the shock absorber;
the terminal portion extends from the neck portion;
the neck portion describes an arc of between about 30° and about 60° about the longitudinal axis of the shock absorber;
the transition portion has a first end and a second end, the first end being directly adjacent the semiannular portion of the means for mounting a roll stabilizer and describing an arc of about 180° about the longitudinal axis of the shock absorber, the second end being directly adjacent the neck portion and describing an arc, corresponding to that described by the neck portion, about the longitudinal axis of the shock absorber;
the neck portion describes a varying arc about the longitudinal axis of the shock absorber, the varying arc varying as a function of longitudinal position between the first end and the second end;
the neck portion having two opposite edge portions, the varying arc being defined between the two opposite edge portions, each of the two opposite edge portions being concave;

the web means further comprising a longitudinal extension, the longitudinal extension comprising the second fastening means;

the longitudinal extension is aligned parallel to the longitudinal axis of the shock absorber and extends in a radial direction away from the shock absorber;

the longitudinal extension is oriented perpendicular with respect to the flat coplanar portions of the means for mounting a roll stabilizer;

a major portion of the longitudinal extension is integral with the neck portion and the terminal portion;

the longitudinal extension comprises a lower portion extending longitudinally beyond the terminal portion of the web means;

the lower portion comprises the means for being fastened to a vehicle axle, the means for being fastened comprises a receptacle for accommodating a vehicle axle;

the receptacle comprises a recessed portion being indented into the lower portion of the longitudinal extension;

the lower portion of the longitudinal extension and the external surface of the outer tube defining a gap therebetween;

the recessed portion having an open end facing the gap defined between the lower portion of the longitudinal extension and the external surface of the outer tube;

the terminal portion of the web means extending circumferentially from the neck portion and describing an arc of between about 30° and about 90° about the longitudinal axis of the shock absorber;

the terminal portion initiating from the neck portion circumferentially remote from the longitudinal extension;

the terminal portion comprising a circumferential portion and a longitudinal flange portion;

each of the circumferential portion and the longitudinal flange portion having a longitudinal dimension defined parallel to the longitudinal axis of the shock absorber;

the longitudinal flange portion extending longitudinally in a direction towards the first fastening means;

the longitudinal flange portion having a greater longitudinal dimension than the circumferential portion; and the longitudinal flange comprising a remote longitudinal edge, the longitudinal edge being remote from the neck portion of the web means;

said step of providing the singular fastening means comprising the steps of:

providing a stamping blank;

configuring the stamping blank such that the dimensions of the stamping blank are determined by the following parameters:

the distance between the holes of the means for mounting a roll stabilizer; and the longitudinal distance between the receptacle and a line joining the holes of the means for mounting a roll stabilizer; and forming the singular fastening means from the stamping blank;

the welding step being performed with an automatic welding machine;

the welding step further comprising the steps of:

providing a welding jig, the welding jig having at least one holding portion for holding a workpiece;

aligning the welding jig adjacent the shock absorber;

holding the singular fastening means, as a single, integral unit, on the external surface of the outer tube of the shock absorber;

welding the singular fastening means to the outer tube by five longitudinal welds, each of the five longitudinal welds being oriented parallel to the longitudinal axis of the shock absorber, the five longitudinal welds comprising:

first and second longitudinal welds welding the first attachment means to the outer tube;

the first longitudinal weld being disposed at one end of the semiannular portion;

the second longitudinal weld being disposed at an opposite end of the semiannular portion;

third, fourth and fifth longitudinal welds welding the web means to the outer tube;

the third longitudinal weld being disposed along a first longitudinal edge of the neck portion of the web means;

the fourth longitudinal weld being disposed along a second, opposite longitudinal edge of the neck portion of the web means and extending along the major portion of the longitudinal extension; and the fifth longitudinal weld being disposed along the remote longitudinal edge of the longitudinal flange of the terminal portion of the web means.

19. The shock absorber according to claim 18, wherein: the singular fastening means further comprises third fastening means;

the third fastening means comprises means for holding a brake hose;

the means for holding a brake hose is disposed between the first fastening means and the second fastening means along the longitudinal extent of the singular fastening means;

the means for holding a brake hose extends from the neck portion of the web means;

the means for holding a brake hose comprises:

a circumferential portion extending circumferentially from the neck portion of the web means, the circumferential portion describing an arc of between about 30° and about 60° about the longitudinal axis of the shock absorber;

a lateral portion extending from the circumferential portion, the lateral portion being parallel to the flat coplanar portions of the means for mounting a roll stabilizer; and a hole for accommodating a brake hose, the hole being disposed through the lateral portion;

the circumferential portion of the terminal portion of the web means:

describes an arc of between about 30° and about 60° about the longitudinal axis of the shock absorber; and initiates from the neck portion of the web means circumferentially remote from the longitudinal extension;

the circumferential portion of the terminal portion of the web means and the circumferential portion of the means for mounting a brake hose describe equivalent arcs about the longitudinal axis of the shock absorber.

20. The shock absorber according to claim 16, wherein: the first fastening means comprises one of:

means for mounting a roll stabilizer; and means for mounting at least one hose; and the second fastening means comprises means for being fastened to a vehicle axle;

said method further comprising:

said step of providing the singular fastening means comprises the step of providing web means rigidly connecting the first fastening means and the second fastening means;

said step of positioning and aligning comprises the step of aligning the web means parallel to the longitudinal axis of the shock absorber;

said step of providing the web means comprises providing at least one arcuate portion;

each of the at least one arcuate portion having an inner radius with respect to the longitudinal axis of the shock absorber;

the outer tube of the shock absorber having an outer radius;

the inner radius of each of the at least one arcuate portion of the connecting web being roughly equal to the outer radius of the outer tube of the shock absorber and being configured to provide a close interfacing contact between each of the at least one arcuate portion of the web means and the external surface of the outer tube;

said method further comprising the step of configuring the shock absorber such that:

the first fastening means comprises means for mounting two brake hoses;

the at least one arcuate portion of the web means comprises a semiannular portion;

the semiannular portion describes an arc of about 180° with respect to the longitudinal axis of the shock absorber;

the web means further comprises a longitudinal extension, the longitudinal extension comprising the second fastening means;

the longitudinal extension is aligned parallel to the longitudinal axis of the shock absorber and extends in a radial direction away from the shock absorber;

the longitudinal extension extends longitudinally from the semiannular portion;

the at least one arcuate portion of the web means further comprising an arcuate extension extending circumferentially from the longitudinal extension;

the arcuate extension describing an angle of between about 30° and about 60° with respect to the longitudinal axis of the shock absorber;

a major portion of the longitudinal extension is integral with the arcuate extension;

the longitudinal extension comprises a lower portion extending longitudinally beyond the arcuate extension;

the lower portion comprises the means for being fastened to a vehicle axle, the means for being fastened comprises a receptacle for accommodating a vehicle axle;

the receptacle comprises a recessed portion being indented into the lower portion of the longitudinal extension;

the lower portion of the longitudinal extension and the external surface of the outer tube defining a gap therebetween;

the recessed portion having an open end facing the gap defined between the lower portion of the longitudinal extension and the external surface of the outer tube;

the means for mounting two brake hoses comprising a first mounting portion and a second mounting portion;

each of the first and second mounting means comprising a base portion extending from a corresponding opposite portion of the semiannular portion of the web means in a plane perpendicular to the longitudinal axis of the shock absorber;

each of the base portion comprising a notch portion for accommodating a corresponding brake hose, each of the notch portion comprising a generally circular hole with a notch-like indentation opening into the generally circular hole;

each of the first and second mounting portions comprising a pair of flange portions extending from the corresponding base portion, each of the flange portion extending longitudinally towards the longitudinal extension;

the arcuate extension comprises a longitudinal edge portion disposed circumferentially remote from the longitudinal extension;

the major portion of the longitudinal extension comprises a longitudinal edge portion disposed opposite the arcuate extension;

said step of providing the singular fastening means comprising the steps of:

providing a stamping blank, the stamping blank being generally flat;

configuring the stamping blank such that the dimensions of the stamping blank are determined by the following parameters:

the distance between the generally circular holes of the notch portions; and the longitudinal distance between the receptacle and a line joining the generally circular holes of the notch portions holes of the means for mounting a roll stabilizer; and forming the singular fastening means from the stamping blank;

the welding step being performed with an automatic welding machine;

the welding step further comprising the steps of:

providing a welding jig, the welding jig having at least one holding portion for holding a workpiece;

aligning the welding jig adjacent the shock absorber;

holding the singular fastening means, as a single, integral unit, on the external surface of the outer tube of the shock absorber;

welding the singular fastening means to the outer tube by at least two longitudinal welds, each of the at least two longitudinal welds being oriented parallel to the longitudinal axis of the shock absorber, the at least two longitudinal welds comprising:

a first longitudinal weld disposed along the longitudinal edge portion of the arcuate extension; and a second longitudinal weld disposed along the longitudinal edge portion of the major portion of the longitudinal extension.

* * * * *

UNITED STATES PATENT AND TRADEMARK OFFICE
CERTIFICATE OF CORRECTION

PATENT NO. : 5,423,403
DATED : June 13, 1995
INVENTOR(S) : Günther HANDKE and Bruno DEIGNER It is certified that error appears in the above-indentified patent and that said Letters Patent is hereby corrected as shown below:

In column 23, line 3, Claim 20, after 'claim', delete "16," and insert --17,--.

Signed and Sealed this

Fifteenth Day of October, 1996

Attest:

BRUCE LEHMAN

Attesting Officer          Commissioner of Patents and Trademarks